(12) United States Patent
Xu et al.

(10) Patent No.: US 11,727,028 B2
(45) Date of Patent: Aug. 15, 2023

(54) METHODS AND SYSTEMS FOR DATA WRANGLING

(71) Applicant: MicroStrategy Incorporated, Tysons Corner, VA (US)

(72) Inventors: Ruiqing Xu, Hangzhou (CN); Xi Kou, Hangzhou (CN); Xiaoqian Zhu, Hangzhou (CN)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 0 days.

(21) Appl. No.: 17/237,218

(22) Filed: Apr. 22, 2021

(65) Prior Publication Data

US 2021/0334288 A1 Oct. 28, 2021

Related U.S. Application Data

(60) Provisional application No. 63/015,170, filed on Apr. 24, 2020.

(51) Int. Cl.
*G06F 16/00* (2019.01)
*G06F 16/25* (2019.01)
*G06F 16/22* (2019.01)
*G06F 16/23* (2019.01)
*G06F 16/28* (2019.01)

(52) U.S. Cl.
CPC ........ *G06F 16/254* (2019.01); *G06F 16/2264* (2019.01); *G06F 16/2282* (2019.01); *G06F 16/2379* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 10,095,759 B1* | 10/2018 | Cappiello | G06F 16/25 |
| 10,733,198 B1* | 8/2020 | Marschner | G06F 16/252 |
| 2016/0188692 A1* | 6/2016 | Tsumura | G06F 16/955 |
| | | | 707/737 |
| 2018/0113894 A1* | 4/2018 | Raza | G06F 16/221 |
| 2018/0210935 A1* | 7/2018 | Yazicioglu | G06F 40/186 |
| 2018/0336254 A1* | 11/2018 | Bergman | G06F 9/5027 |

* cited by examiner

*Primary Examiner* — Anhtai V Tran
(74) *Attorney, Agent, or Firm* — Bookoff McAndrews, PLLC (57) ABSTRACT

Disclosed are methods, systems, and computer-readable medium for data wrangling. For instance, the method may include: determining one or more data operations to be performed on a multi-dimensional dataset; determining at least one operation type associated with the one or more data operations to be performed; dividing the multi-dimensional dataset into a plurality of sub-tables based on the operation type; providing the plurality of sub-tables to a data wrangling process, the one or more data operations being performed on each of the plurality of sub-tables in parallel to determine a processed plurality of sub-tables; and determining, based on the processed plurality of sub-tables, a finished multi-dimensional dataset. The data wrangling process may process sub-tables (e.g., change-only columns/rows) of tables of the multi-dimensional dataset and/or process sub-tables in parallel for data operations that are not related.

17 Claims, 4 Drawing Sheets

METHODS AND SYSTEMS FOR DATA WRANGLING

CROSS-REFERENCE TO RELATED APPLICATION

This application claims benefit to U.S. Provisional Patent Application No. 63/015,170, filed on Apr. 24, 2020, the entire contents of which are incorporated herein by reference.

TECHNICAL FIELD

Various embodiments of the present disclosure relate generally to methods and systems for data wrangling and, more particularly, to methods and systems for data wrangling using sub-tables and/or parallelism.

BACKGROUND

Organizations are generating and utilizing ever greater amounts of data. This data is processed and used in making decisions in business, government, and other settings. In many cases, datasets are not in the appropriate form necessary to interpret and use the data in the datasets, and significant operations may be needed to prepare datasets for use. For instance, processing of an online analytical processing (OLAP) cube may include: a client splits the cube into several tables; the client sends each table in sequence to a server executing a program to process the table in sequence; the client sends a data wrangling script for each table to the server; the server applies the data wrangling script to process the table; and the server sends back the processed table to the client. However, data wrangling (e.g., processing the table) may be a significant source of delay in publishing an OLAP cube, as compared to the time required to parse data, fetch data, or other processing for publishing the OLAP cube. Therefore, more efficient data wrangling is a challenge, for instance in time to completion and memory utilization, especially as a number of columns to be processed increases and/or operations to be performed increases.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for data wrangling. For instance, a method may include: determining one or more data operations to be performed on a multi-dimensional dataset; determining at least one operation type associated with the one or more data operations to be performed; dividing the multi-dimensional dataset into a plurality of sub-tables based on the operation type; providing the plurality of sub-tables to a data wrangling process, the one or more data operations being performed on each of the plurality of sub-tables in parallel to determine a processed plurality of sub-tables; and determining, based on the processed plurality of sub-tables, a finished multi-dimensional dataset.

Furthermore, a system may include at least one memory storing instructions; and at least one processor executing the instructions to perform operations. The operations may include determining one or more data operations to be performed on a multi-dimensional dataset; determining at least one operation type associated with the one or more data operations to be performed; dividing the multi-dimensional dataset into a plurality of sub-tables based on the operation type; providing the plurality of sub-tables to a data wrangling process, the one or more data operations being performed on each of the plurality of sub-tables in parallel to determine a processed plurality of sub-tables; and determining, based on the processed plurality of sub-tables, a finished multi-dimensional dataset.

Moreover, a non-transitory computer-readable medium may store instructions that, when executed by a processor, cause the processor to perform operations. The operations may include: determining one or more data operations to be performed on a multi-dimensional dataset; determining at least one operation type associated with the one or more data operations to be performed; dividing the multi-dimensional dataset into a plurality of sub-tables based on the operation type; providing the plurality of sub-tables to a data wrangling process, the one or more data operations being performed on each of the plurality of sub-tables in parallel to determine a processed plurality of sub-tables; and determining, based on the processed plurality of sub-tables, a finished multi-dimensional dataset.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for data wrangling.

In general, the present disclosure is directed to methods and systems for data wrangling using sub-tables (e.g., change-only columns/rows) and/or parallelism. For instance, a system of the present disclosure may determine data wrangling operations to be performed on a multi-dimensional dataset (such as an OLAP cube); determine scripts and sub-tables for projects; and transmit the scripts and the sub-tables for the projects to a server to be processed. The sub-tables may be determined so that only columns/rows that are being changed (e.g., change-only columns/rows) are sent to the server, and the data wrangling operations of the scripts may be processed in parallel for sub-tables that are not related (e.g., operations to be applied to different columns/rows). In this manner, the methods and systems of the present disclosure may reduce processing time and memory usage, as discussed herein.

While this disclosure describes the systems and methods with reference to data wrangling of OLAP cubes, it should be appreciated that the present systems and methods may be applicable to data wrangling of multi-dimensional datasets in general.

Figure 1:
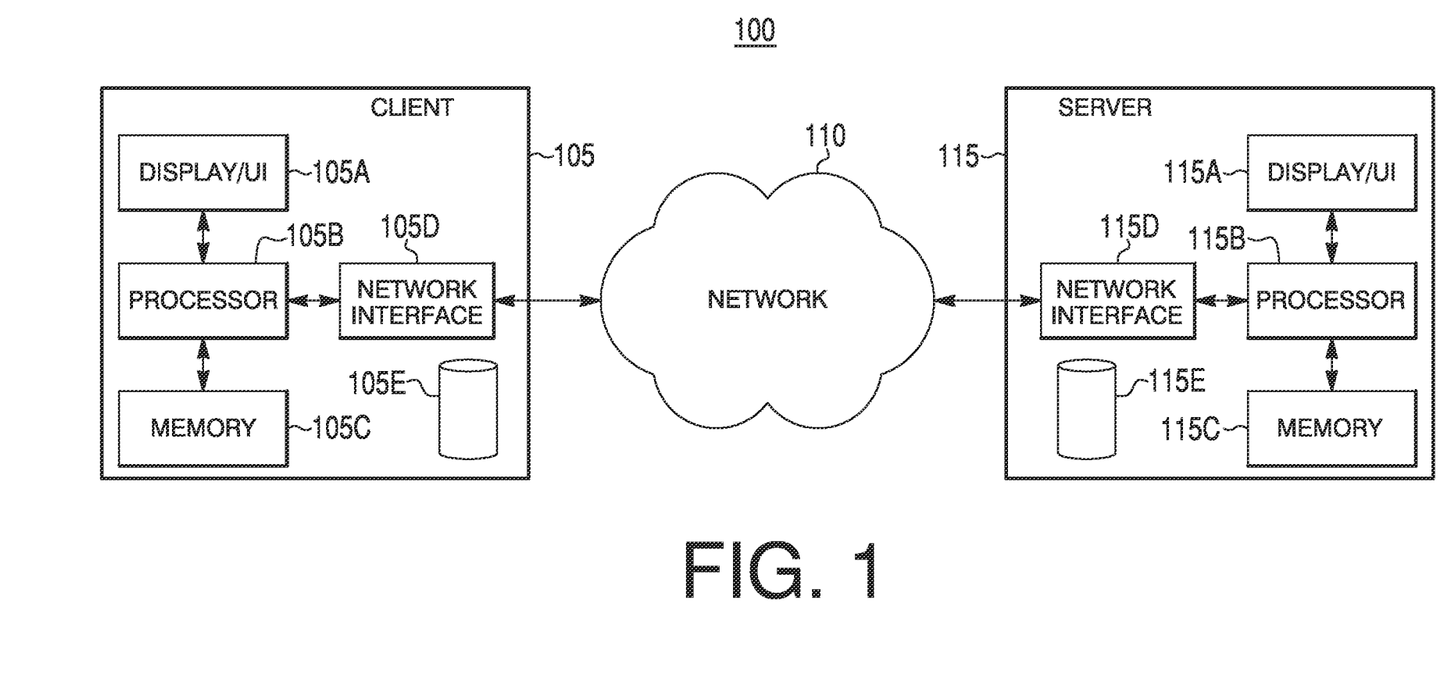
FIG. 1 depicts an exemplary block diagram of a system for data wrangling, according to one or more embodiments.

FIG. 1 depicts an exemplary block diagram of a system for data wrangling, according to one or more embodiments. The system 100 may include at least one client 105, a network 110, and/or at least one server 115. While the server 115 may interact with the client 105, one of skill in the art would recognize that the server 115 may interact with one or more clients 105, or that the client 105 and the server 115 may be hosted on a same device or same cloud platform. Generally, while the functionality carried out by the server 115 and/or the client 105 are discussed herein separately, in practice these features may be executed on more or fewer devices.

The client 105 and the server 115 may be connected via the network 110, using one or more standard communication protocols. The network 110 may be one or a combination of a wide area network (e.g., the internet), a local network, or other network. The client 105 and the server 115 may transmit and receive messages from each other across the network 110.

The client 105 may include a display/user interface (UI) 105A, a processor 105B, a memory 105C, a network interface 105D, and/or a database 105E. The client 105 may be a computer, a cell phone, a tablet, etc. The client 105 may execute, by the processor 105B, an operating system (O/S) and at least one application (each stored in memory 105C). The application may be desktop program, a browser program, or a mobile application program (which may also be a browser program in a mobile O/S). The application may manage the database 105E, as discussed below, to publish OLAP cube(s). The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 110. The processor 105B, while executing the application, may (1) receive user inputs from the display/UI 105A and/or receive/transmit messages to the server 115, and (2) perform operations in accordance with techniques described herein.

The application, executed by the processor 105B of the client 105, may process imported data into a database table and/or an OLAP cube, such as for an analytics platform. An OLAP cube may be a multi-dimensional array of data including related tables. For example, the client 105 may receive imported data from any of various sources, such as spreadsheets, comma-separated value (CSV) files, customer relationship management (CRM) systems, office productivity software, cloud computing platforms, and so on. The imported data may be structured or unstructured data. The client 105 then processes the imported data to publish a functional, queryable OLAP cube and/or re-publish (e.g., update) an existing OLAP cube, and/or table(s), using the imported data. The published or republished table(s) and/or OLAP cube(s) may be stored in the database 105E. The imported data may be stored in the memory 105C until the publishing process is complete, then removed (e.g., deleted) from the memory 105C. Although operations on OLAP cubes or portions thereof are discussed herein, these operations may be performed on a database table or collection of tables.

In one aspect of the disclosure, the publish process executed by the application may include: obtain imported data; generate an initial cube and/or table(s) based on the imported data and/or determine an existing cube or table to be updated based on the imported data; obtain one or more (e.g., a plurality of) data operations to be performed on the initial cube and/or the existing cube or table; cause the one or more data operations to be performed on the initial cube and/or the existing cube or table to obtain a finished cube and/or table; and publish the finished cube and/or table. Generally, the client 105 may be instructed by a user device to publish a new cube based on the imported data and//or to update the existing cube or table based on the imported data.

To obtain the imported data, the client 105 may receive imported data in various manners. For instance, the client 105 may receive the imported data (or portions thereof) from a user device in response to a user input to send the imported data; automatically request the imported data (or portions thereof) from third party sources and/or user devices; and/or automatically receive the imported data (or portions thereof) as a part of scheduled data collection processes. Generally, the imported data may be received in accordance with an application programming interface (API) framework of the client 105 from the third party sources and/or user devices.

The client 105 may generate a data model for the initial cube based on the imported data and data model rules; and populate the data model using the imported data. The data model may include a logical structure of the initial cube and determine in which manner data of the imported data may be stored. The data model rules may be scripts and/or machine learning models to determine the logical structure based on the data of the imported data. Additionally, the client 105 may generate a semantic layer for the initial cube based on the imported data and semantic rules. The semantic layer may map data of the imported data to familiar terms, such as product, customer, or revenue. The semantic layer rules may be scripts and/or machine learning models to determine the mapping between data of the imported data and the familiar terms.

To determine the existing cube or table to be updated based on the imported data, the client 105 may identify an existing cube or table from among a plurality of existing cubes or tables based on the imported data. For instance, the client 105 may receive the imported data; extract a cube identifier (ID) or table ID from the imported data, e.g., in a message transmitting the imported data; determine a matching cube ID or table ID for one of the plurality of existing cubes or tables; and, in response to determining the matching cube ID or table ID, determine a corresponding existing cube or table as the existing cube or table to be updated.

To obtain the one or more (e.g., the plurality of) data operations to be performed on the initial cube and/or the existing cube or table, the client 105 may receive or determine data wrangling operations information; and extract data operations and target columns/rows from the data wrangling operations information. The data operations may include one or more of: mass edit to fix values in rows and/ow columns; column or row removal; text or data transform for a column or row; column or row rename; row or column addition; column split; fill down for a column or row; column or row extraction; column or row concatenation; padding value before/after a column or row; changing a column datatype; and/or, generally, any other dataset operation on columns or rows of an OLAP cube or a table. For each data operation, the data wrangling operations information may include corresponding target columns and/or rows that are to be effected by the data operation. For instance, the client 105 may receive the data wrangling operations information in an instruction message from a user device. To determine the data wrangling operations information, the client 105 may analyze the imported data and/or the existing cube or table; and determine data operations based on the imported data and/or the existing cube based on data wrangling scripts and/or machine learning models. For instance, the data wrangling scripts and/or machine learning models may suggest data operations to a user of a user device, and the user of the user device may approve of the data operations.

To cause the one or more data operations to be performed on the initial cube and/or the existing cube or table (hereafter, "cube" for ease of reference) to obtain the finished cube, the client 105 may: determine the one or more data operations to be performed on a cube (or a multi-dimensional dataset), as discussed above; determine at least one operation type associated with the one or more data operations to be performed; divide the cube (or the multi-dimensional dataset) into a plurality of sub-tables based on the operation type; providing the plurality of sub-tables to a data wrangling process, the one or more data operations being performed on each of the plurality of sub-tables in parallel to determine a processed plurality of sub-tables; and determining, based on the processed plurality of sub-tables, a finished cube (or finished multi-dimensional dataset). For instance, the providing the plurality of sub-tables to the data wrangling process may include: transmitting instruction message(s) for projects to the server 115 so that the server 115 may perform the one or more data operations on the cube, as discussed below.

To determine at least one operation type associated with the one or more data operations to be performed, the client 105 may determine an operation type for each of the one or more data operations; and determine the operation type associated with the one or more data operations based on the operation type for each of the one or more data operations. For instance, the client 105 may determine an operation type for a data operation by classifying the data operation as a column type operation, a row type operation, or a mixed operation. To classify the data operation as a column type operation, the client 105 may determine whether the data operation is one of: column removal; text or data transform for a column; column rename; column addition; column split; column extraction; column concatenation; padding value before/after a column; changing a column datatype; and/or fill down for a column. To classify the data operation as a row type operation, the client 105 may determine whether the data operation is one of: a row removal; a text or data transform for a row; a row rename; a row addition; row extraction; row concatenation; padding value before/after a row; and/or a fill down for a row. To classify the data operation as a mixed typed operation, the client 105 may determine whether the data operation is a mass edit.

To determine the operation type associated with the one or more data operations based on the operation type for each of the one or more data operations, the client 105 may classify the operation type as an all column operation type, all row operation type, or a mixed operation type. To classify the operation type as the all column operation type, the client 105 may determine whether all of the operations are column type operations. To classify the operation type as the all row operation type, the client 105 may determine all of the operations are row type operations. To classify the operation type as the mixed operation type, the client 105 may (1) determine at least one of the operations are a column type operation and at least one of the operations are a row type operation; (2) determine at least one of the operations are a column type operation and at least one of the operations are a mixed type operation; (2) determine at least one of the operations are a row type operation and at least one of the operations are a mixed type operation; (4) determine at least one of the operations are a column type operation, at least one of the operations are a row type operation and at least one of the operations are a mixed type operation; and/or (5) determine at least one of the operations are a mixed type operation.

To divide the cube (or the multi-dimensional dataset) into a plurality of sub-tables based on the operation type, the client 105 may determine scripts and sub-tables for projects based on the operation type; and extract the sub-tables from the multi-dimensional dataset.

To determine scripts and sub-tables for projects based on the operation type, the client 105 may: split the cube (or the multi-dimensional dataset) into tables; group operations based on the operation type and/or columns and/or rows of the tables targeted by the columns and/or rows of the operations; and set the grouped operations as the scripts for the sub-tables. A script may be a sequence of data operations to be performed on a sub-table, such as first apply a first data operation on a first column, then apply a second data operation on a second column, etc. An example is discussed in FIG. 3 below. The client 105 may form the scripts based on the grouped operations and script rules. The script rules may set an order of operation of different types of data operations (e.g., delete columns before adding or splitting existing columns, etc.).

To group the operations, the client 105 may determine: at least one operation of the one or more data operations are to be performed on a single column or row; at least two operations of the one or more data operations are to be performed on adjacent columns or rows, a plurality of operations of the one or more data operations are to be performed on columns or rows within a threshold number (e.g., two, three, four, etc.) of columns or rows from each other.

Specifically, the client 105 may determine the groupings of the operations based on the operation type. In response to determining the operation type is an all column operation type, the client 105 may map sets of operations to sets of columns targeted by the set of operations; divide columns of the sets of columns into sets of rows; and determine the sets of operations as the groupings, each set of operations being a group. A set of operations may include: (1) at least one operation to be performed on a single column; (2) at least two operations to be performed on adjacent columns; or (3) a plurality of operations to be performed on columns within the threshold number of columns from each other. The set of columns may correspond to: (1) the single column; (2) the adjacent columns; or (3) the columns within the threshold number of columns from each other. The sets of rows may be all of the rows of the set of columns split for a defined number of splits.

In response to determining the operation type is an all row operation type, the client 105 may map sets of operations to sets of rows targeted by the set of operations; divide rows of the sets of rows into sets of columns; and determine the sets of operations as the groupings, each set of operations being a group. A set of operations may include: (1) at least one operation to be performed on a single row; (2) at least two operations to be performed on adjacent rows; or (3) a plurality of operations to be performed on rows within the threshold number of rows from each other. The set of columns may correspond to: (1) the single row; (2) the adjacent rows; or (3) the rows within the threshold number of rows from each other. The sets of columns may be all of the columns of the set of rows split for a defined number of splits.

In response to determining the operation type is a mixed operation type, the client 105 may determine whether there are more column type operations or more row type operations. In response to determining there are more column type operations, map sets of operations for any operations that are column type operations to sets of columns targeted by the set of operations; divide columns of the sets of columns into sets of rows; determine the sets of operations as the groupings, each set of operations being a group; and, for groupings that have a row targeted by any of the operations that are a row type operation, including an operation that targets a row of the set of rows in the grouping. In response to determining there are more row type operations, map sets of operations for any operations that are row type operations to sets of rows targeted by the set of operations; divide rows of the sets of rows into sets of columns; determine the sets of operations as the groupings, each set of operations being a group; and, for groupings that have a column targeted by any of the operations that are a column type operation, including an operation that targets a column of the set of rows in the grouping.

To extract the sub-tables from the cube, the client 105 may slice the tables of the cube to form the sub-tables. For instance, the client may 105 may slice the tables to form the sub-tables based on the groupings. For instance, the client 105 may slice out columns/rows affected by operations of a grouping as the sub-table of a table. To slice a table for a sub-table for a grouping, the client 105 may extract the columns/rows in accordance with the sets of columns and the sets of rows of the grouping, as discussed above. For instance, the client 105 may extract: a single column with its set of rows; adjacent columns with their sets of rows; and/or a set of continuous (e.g., each being adjacent to another one) columns with their sets of rows; a single row with its set of columns; adjacent rows with all of their set of columns; and/or a set of continuous (e.g., each being adjacent to another one) rows with their set of columns, as indicated by the sets of columns and the sets of rows for the grouping. The client 105 may store an index of a location of where the sub-table was extracted from and associate the location with a project ID, so that when a processed sub-table is received with a project ID the client 105 may insert the processed sub-table back into a location in accordance with the logical structure.

To provide the plurality of sub-tables to the data wrangling process, the client 105 may transmit the scripts and sub-tables (together or separately) to the server 115. To transmit the scripts and sub-tables (together or separately) to the server 115, the client 105 may generate and transmit instruction messages to the server 115. The instruction messages may include the scripts and/or the sub-tables for the projects. Specifically, the instruction messages may indicate each script and sub-table as belonging to particular project, e.g., by associating the script and the sub-table with a project ID. The server 115 may execute the projects in parallel using the scripts and sub-tables. The server 115 may then transmit the processed sub-tables to the client 105. Executing the projects in parallel using the scripts and sub-tables and transmitting the processed sub-tables to the client 105 are discussed below with regard to the server 115.

The server 115 may include a display/UI 115A, a processor 115B, a memory 115C, a network interface 115D, and/or database 115E. The server 115 may be a computer, system of computers (e.g., rack server(s)), and/or or a cloud service computer system. The server 115 may execute, by the processor 115B, an operating system (O/S) and at least one instance of a servlet program (each stored in memory 115C). The server 115 may store or have access to database 115E (e.g., hosted on a third party server or in memory 115C). The display/UI 115A may be a touch screen or a display with other input systems (e.g., mouse, keyboard, etc.) for an operator of the server 115 to control the functions of the server 115 (e.g., update the servlet program). The network interface 115D may be a TCP/IP network interface for, e.g., Ethernet or wireless communications with the network 110.

The servlet program, which may be executed by the processor 115B on the server 115, may receive the instruction messages; extract the scripts and sub-tables for the projects from the instruction messages; execute the scripts on the sub-tables for the projects; and transmit the processed sub-tables to the client 105.

To execute the scripts on the sub-tables for the projects, the server 115 may determine associated scripts and sub-tables based on one or more identifiers such as project IDs, initiate parallel threads for the projects; and process sub-tables in the threads in accordance with the scripts. Generally, the server 115 may execute grouped operations on the sub-tables in the sequence indicated by the scripts.

To transmit the processed sub-tables to the client 105, the server 115 may generate and transmit completion messages to the client 105. The completion messages may include the processed sub-tables associated with their project IDs.

Returning to the client 105, to determine, based on the processed plurality of sub-tables, the cube (or the finished multi-dimensional dataset), the client 105 may re-join the processed sub-tables to the cube. To re-join the processed sub-tables to the cube, the client 105 may obtain the completion messages from the server 115; extract the processed sub-stables (e.g., plurality of processed sub-stables) and project IDs; and update the corresponding tables (e.g., by inserting the processed sub-tables where the sub-tables were extracted) based on the processed sub-tables and project IDs. For instance, the client 105 may use the index of the locations and associated project IDs so that the processed sub-table is inserted back into a location in accordance with the logical structure.

Returning to the publish process, to publish the finished cube, the client 105 may make the final cube available on the analytics platform. For instance, the client 105 may publish the final cube so that the final cube is accessible and queryable by end users of the analytics platform.

Using the methods and systems of the present disclosure may significantly reduce process time and memory utilization of the publish process. For instance, a summary of comparisons are presented below between an existing data wrangling process (in which whole tables are processed sequentially) and a system of the present disclosure: (1) For file size versus time: the system of the present disclosure took less time for file sizes between 500M to 2G for a single data operation, with the 2G file size being eight times faster; (2) For operation number versus time: the system of the present disclosure took less time for one (1) to eight (8) data operations for a 500M file size, with the eight data operations being around 5.5 times faster; (3) For data wrangling column number versus time: the system of the present disclosure took less time for one (1) to four (4) columns for a 500M file size with eight (8) data operations, with the four columns being around 7.2 times faster; (4) For memory usage versus operation number: the system of the present disclosure used less memory for one (1) to eight (8) data operations for a 500M file size, with the eight data operations reducing memory usage by 65%.

Moreover, all of these improvements may only require a minor increase in CPU usage, or might not require any increase in CPU usage, or might require less CPU usage. For instance, a summary of a comparisons is presented below between an existing data wrangling process (in which whole tables are processed sequentially) and the system of the present disclosure: For CPU usage versus operation number: the system of the present disclosure used more CPU usage for one (1) to eight (8) data operations for a 500M file size, with the eight data operations increasing the CPU usage from 10% to 31%.

Generally, the grouping of the operations may determine operations that are related (e.g., operate on same or closely related columns, such as being with the threshold number) and/or sets of columns/rows that have operations to be performed. For instance, in existing data wrangling processes, a large dataset might be very slow to be processed at a data wrangling server. However, since the data operations might only be column based or row based, a smaller part of the table (e.g., change related columns/change related rows) may be sent to the server 115 to apply the operations to reduce overall processing time/memory usage. Moreover, non-related operations (e.g., applied to different columns/rows) might be processed simultaneously, as there is no need to process them sequentially, therefore the client 105 may group the operations into different sets, with each set corresponding to a set of columns to change. Therefore, the data wrangle time and memory usage may be reduced by both (1) selecting and sending change related columns/rows, and/or (2) processing non-related operations for columns/rows in parallel on the server 115.

Figure 2:
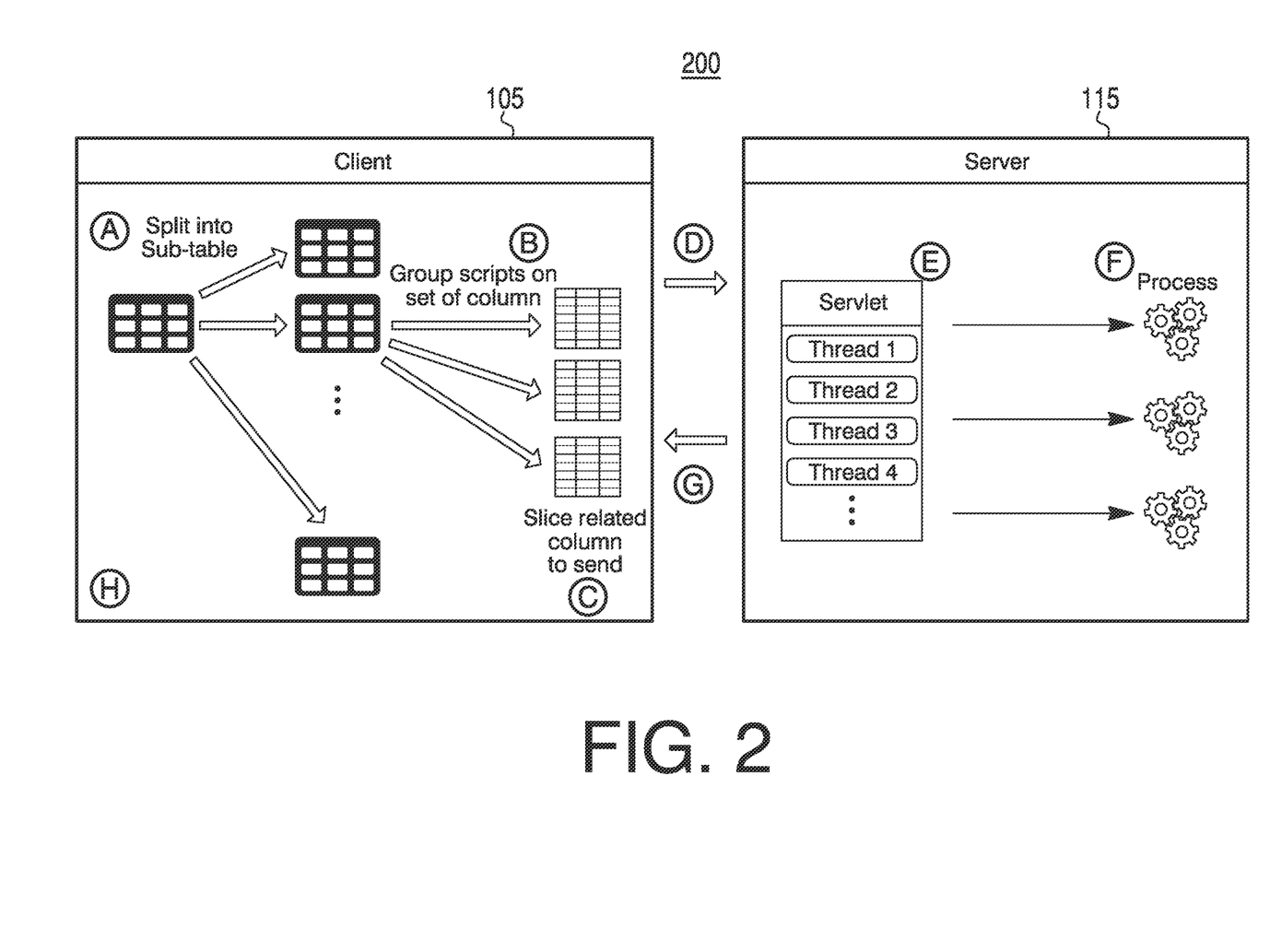
FIG. 2 depicts an exemplary diagram for operations for splitting sub-tables and performing other data wrangling operations, according to one or more embodiments.

FIG. 2 depicts an exemplary diagram for splitting sub-tables and performing other data wrangling operations, according to one or more embodiments. The application on the client 105 and the servlet program on the server 115 may perform operations to prepare an OLAP cube to be published for use. The operations may be explained with respect to various stages labelled (A) through (H). While the below discussion of FIG. 2 refers to columns, the concepts apply for operations on columns and rows, and for operations on rows.

In stage (A), the client 105 may receive/obtain instructions to publish a cube (e.g., an existing or new), along with imported data, and/or data operations information. The client 105 may then proceed split the cube into tables.

In stage (B), the client 105 may then proceed to group scripts on a set of columns. For instance, the client 105 may group operations of scripts on columns that have changes and/or group operations of the scripts on columns that are unrelated, as discussed above in FIG. 1.

In stage (C), the client 105 may slice the related columns to form sub-tables of columns or rows for projects. The projects may implement the operations of the scripts on the sub-tables.

In stage (D), the client 105 may provide instruction messages including the scripts and/or sub-tables. For instance, the client 105 may send the scripts in a separate message as the sub-tables, with each being associated with a project ID, so that the server 115 may match scripts and sub-tables to process the projects in parallel.

In stage (E), the server 115 may receive the instruction message(s) and uses the servlet to initiate at least one thread to execute the projects of the instruction messages. For instance, the server 115 may extract scripts and sub-tables, determine which scripts and sub-tables belong to projects; and initiate threads to process the sub-tables using the scripts in parallel. For example, each thread may process one of a plurality of sub-tables generated in stage (C).

In stage (F), the server 115 may process the sub-tables using the scripts in parallel in each of threads. The server 115 may send completion messages as threads are completed or may wait to send the completion messages until all threads are completed. In stage (G), the server may provide the completion messages to the client 105 including the processed sub-tables for the projects.

In stage (H), the client 105 may re-join the processed sub-tables and publish the cube. For instance, the client 105 may insert the processed sub-tables into the cube and make the cube available on an analytics platform.

Figure 3:
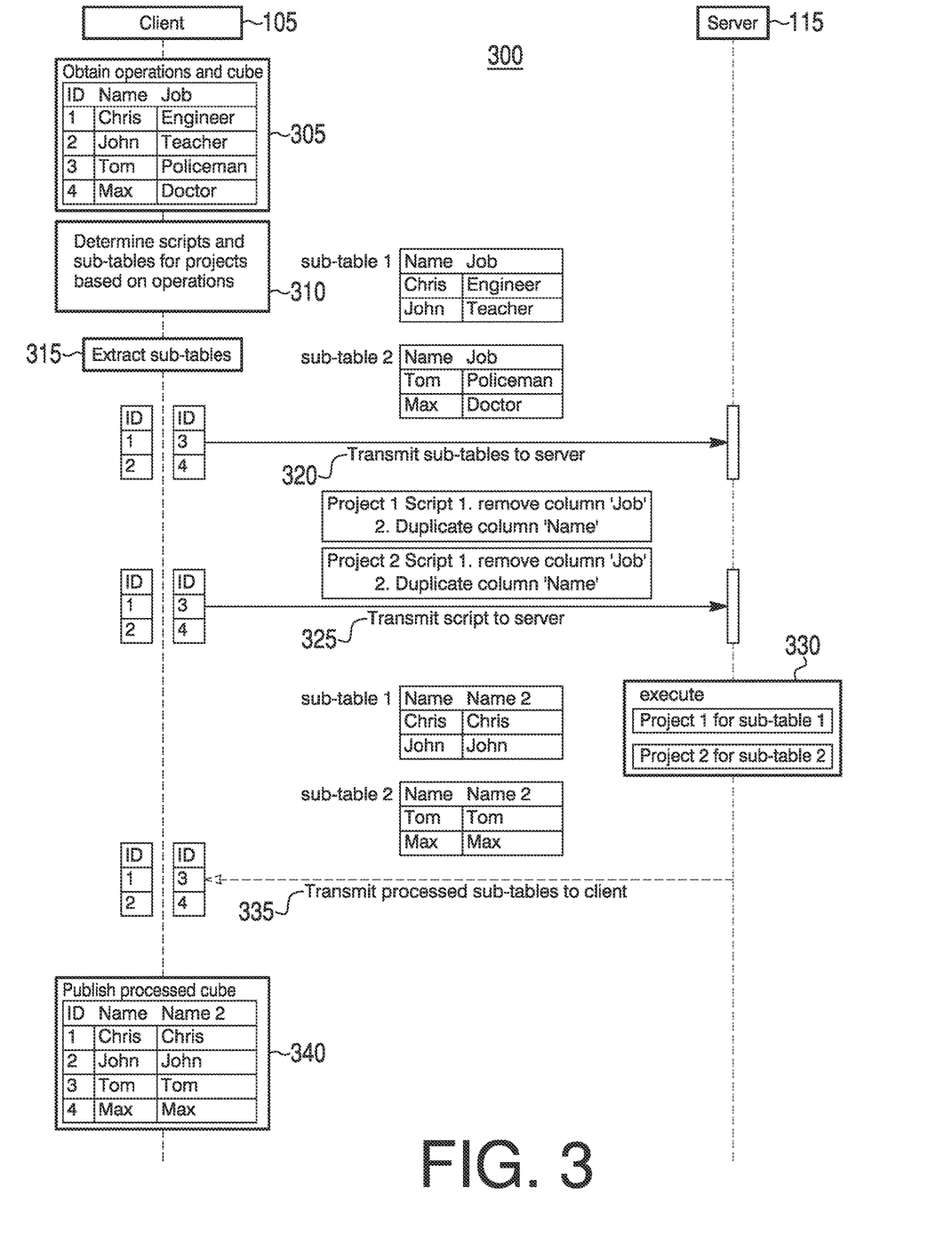
FIG. 3 depicts a flowchart for data wrangling, according to one or more embodiments.

FIG. 3 is a flowchart depicting a method of data wrangling, according to one or more embodiments. The method 300 may be performed by, e.g., the client 105 executing the application and the server 115 executing the servlet program, as discussed above.

For instance, the client 105 may start the process of the method 300 by obtaining operations and a cube (block 305). For instance, the client 105 may receive an instruction to publish a cube in accordance with the operations, for instance as discussed above in relation to FIG. 1, to publish newly imported data and/or to update an existing cube or table.

The client 105 may then determine scripts and sub-tables for projects based on the operations (block 310). For instance, the client 105 may determine the scripts and sub-tables by grouping the operations on columns and/or rows that are the same, adjacent, nearby, and/or related, as discussed above in FIG. 1. As an example, as depicted in FIG. 3, two sub-tables for columns "name" and "job" have been grouped for a first operation to delete column "job" and for a second operation to duplicate column "name," in which the unrelated rows for ID one and ID two are to be processed in parallel to the rows for ID three and ID four.

The client 105 may then extract the one or more sub-tables (block 315). For instance, the client 105 may slice the sub-tables from the tables, as discussed above in relation to FIGS. 1 and 2.

The client 105 may then transmit the sub-tables to the server 115 (block 320). The client 105 may then transmit the scripts to the server 115 (block 325). The client 105 may instead transmit the sub-tables and the scripts at the same time. Generally, the scripts and the sub-tables are associated with project IDs so that the server 115 may determine which scripts are to be applied to which sub-tables.

The server 115 may then execute the projects for the scripts on the sub-tables in parallel (block 330). For instance, the server 115 may initiate the threads and process the sub-tables in accordance with the scripts in the threads, as discussed above in FIG. 1. As an example, as depicted in FIG. 3, the two sub-tables delete their respective columns "jobs," and duplicate the column "name," in accordance with their respective scripts.

The server 115 may then transmit the processed sub-tables to the client 105 (block 335). For instance, the server 115 may transmit the completion messages when all of sub-tables have been processed or as the sub-tables are processed, as discussed above in FIG. 1.

The client 105 may then re-join the processed sub-tables and publish the cube (block 340). For instance, the client 105 may insert the processed sub-tables into the cube and make the cube available on an analytics platform, as discussed above in FIG. 1.

While techniques discussed herein discuss steps performed by a client 105 and steps performed by a server 115, these steps may be performed entirely on a single device, such as server 115 or client 105. Alternatively, these steps may be practiced on more devices than the client 105 and server 115. For example, there may be more than on client 105 and/or more than one server 115.

Figure 4:
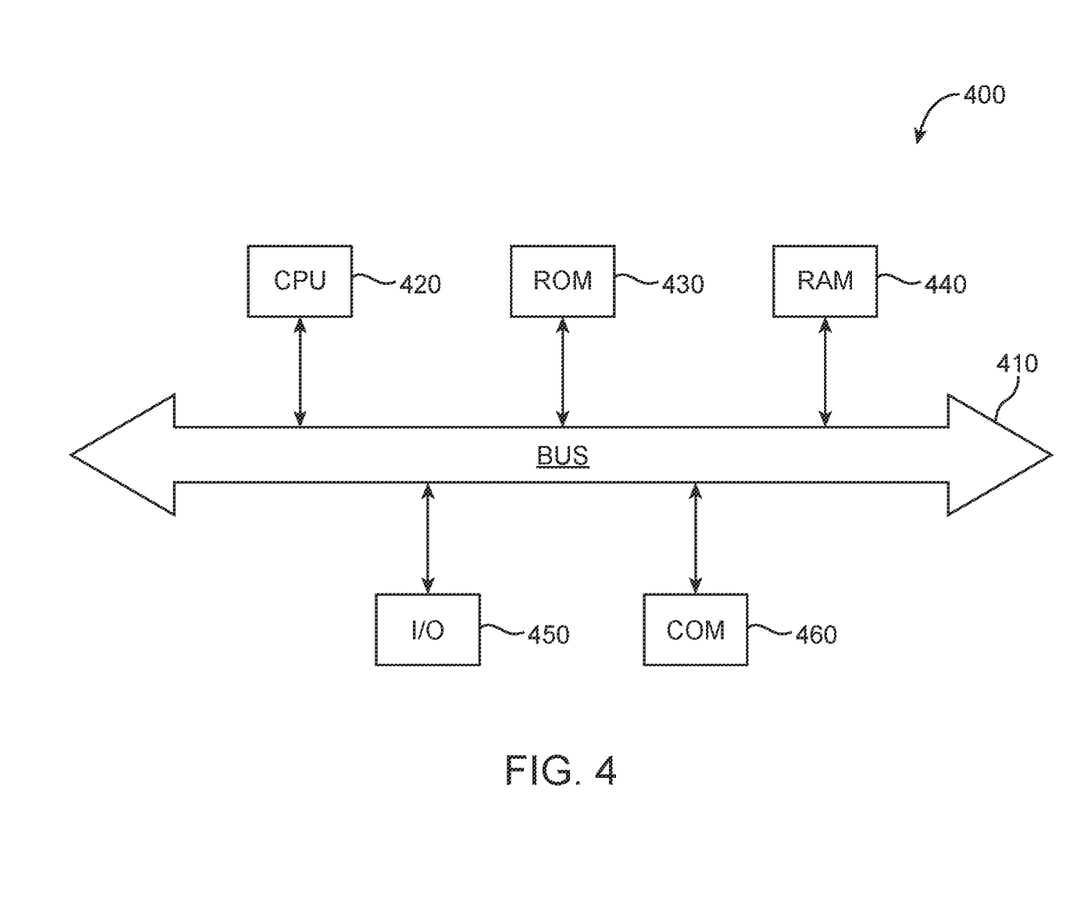
FIG. 4 depicts an example system that may execute techniques presented herein.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for data wrangling, comprising:
   determining one or more data operations to be performed on a multi-dimensional dataset;
   determining at least one operation type associated with the one or more data operations to be performed;
   determining a plurality of scripts and a plurality of sub-tables based on the at least one operation type;
   extracting the sub-tables from the multi-dimensional dataset;
   providing the plurality of scripts and the plurality of sub-tables to a data wrangling process, the data wrangling process processing each of the plurality of sub-tables in parallel using the scripts to determine a processed plurality of sub-tables;
   receiving completion message(s) from the data wrangling process, the completion message(s) including the processed plurality of sub-tables; and
   re-joining the processed plurality of sub-tables to the multi-dimensional dataset,
   wherein the re-joining the processed plurality of sub-tables to the multi-dimensional dataset comprises:
      extracting the processed plurality of sub-tables from the completion message(s); and
      updating tables of the multi-dimensional dataset based on the processed plurality of sub-tables.

2. The method of claim 1, wherein the data wrangling process comprises:
   transmitting the scripts and plurality of sub-tables to a server, the server processing the plurality of sub-tables in parallel using the scripts and plurality of sub-tables to determine the processed plurality of sub-tables; and
   receiving the completion message(s) from the server.

3. The method of claim 1, wherein determining the plurality of scripts and the plurality of sub-tables based on the operation type further comprises:
   splitting the multi-dimensional dataset into tables;
   determining groupings of operations based on columns and/or rows of the tables targeted by the data operations;
   extracting the plurality of sub-tables from the tables based on the groupings; and
   determining scripts for each of the plurality of sub-tables based on the groupings.

4. The method of claim 1, wherein determining the plurality of scripts and the plurality of sub-tables based on the operation type further comprises:
   splitting the multi-dimensional dataset into tables;
   determining groupings of operations based on columns and/or rows of the tables targeted by the data operations;
   extracting the plurality of sub-tables from the tables based on the groupings; and
   determining scripts for each of the plurality of sub-tables based on the groupings, and
   wherein determining groupings of operations further comprises:
      determining at least one operation of the one or more data operations to be performed on a column or row; and
      determining at least two operations of the one or more data operations to be performed on adjacent columns or rows, and/or
      determining a plurality of operations of the one or more data operations to be performed on columns or rows within a threshold number of columns or rows from each other.

5. The method of claim 1, wherein determining the plurality of scripts and the plurality of sub-tables based on the operation type further comprises:
   splitting the multi-dimensional dataset into tables;
   determining groupings of operations based on columns and/or rows of the tables targeted by the data operations;
   extracting the plurality of sub-tables from the tables based on the groupings; and
   determining scripts for each of the plurality of sub-tables based on the groupings, and
   wherein the extracting the plurality of sub-tables includes:
      extracting columns or rows associated with a grouping based on the columns or rows targeted by the groupings of the operations.

6. The method of claim 1, further comprising, before determining the one or more data operations:
   receiving imported data; and
   generating an initial multi-dimensional dataset based on the imported data and/or determining an existing multi-dimensional dataset to be updated based on the imported data, the initial multi-dimensional dataset or the existing multi-dimensional dataset being the multi-dimensional dataset upon which the one or more data operations are performed.

7. A system for data wrangling, the system comprising:
   at least one memory storing instructions; and
   at least one processor executing the instructions to perform operations, the operations including:
      determining one or more data operations to be performed on a multi-dimensional dataset;
      determining at least one operation type associated with the one or more data operations to be performed;
      determining a plurality of scripts and a plurality of sub-tables based on the at least one operation type;
      extracting the sub-tables from the multi-dimensional dataset;
      providing the plurality of scripts and the plurality of sub-tables to a data wrangling process, the data wrangling process processing each of the plurality of sub-tables in parallel using the scripts to determine a processed plurality of sub-tables;
      receiving completion message(s) from the data wrangling process, the completion message(s) including the processed plurality of sub-tables; and
      re-joining the processed plurality of sub-tables to the multi-dimensional dataset, wherein the re-joining the processed plurality of sub-tables to the multi-dimensional dataset comprises:
extracting the processed plurality of sub-tables from the completion message(s); and
updating tables of the multi-dimensional dataset based on the processed plurality of sub-tables.

8. The system of claim 7, wherein the data wrangling process comprises:
transmitting the scripts and plurality of sub-tables to a server, the server processing the plurality of sub-tables in parallel using the scripts and plurality of sub-tables to determine the processed plurality of sub-tables; and
receiving the completion message(s) from the server.

9. The system of claim 7, wherein determining the plurality of scripts and the plurality of sub-tables based on the operation type further comprises:
splitting the multi-dimensional dataset into tables;
determining groupings of operations based on columns and/or rows of the tables targeted by the data operations;
extracting the plurality of sub-tables from the tables based on the groupings; and
determining scripts for each of the plurality of sub-tables based on the groupings.

10. The system of claim 7, wherein determining the plurality of scripts and the plurality of sub-tables based on the operation type further comprises:
splitting the multi-dimensional dataset into tables;
determining groupings of operations based on columns and/or rows of the tables targeted by the data operations;
extracting the plurality of sub-tables from the tables based on the groupings; and
determining scripts for each of the plurality of sub-tables based on the groupings, and
wherein determining groupings of operations further comprises:
determining at least one operation of the one or more data operations to be performed on a column or row; and
determining at least two operations of the one or more data operations to be performed on adjacent columns or rows, and/or
determining a plurality of operations of the one or more data operations to be performed on columns or rows within a threshold number of columns or rows from each other.

11. The system of claim 7, wherein determining the plurality of scripts and the plurality of sub-tables based on the operation type further comprises:
splitting the multi-dimensional dataset into tables;
determining groupings of operations based on columns and/or rows of the tables targeted by the data operations;
extracting the plurality of sub-tables from the tables based on the groupings; and
determining scripts for each of the plurality of sub-tables based on the groupings, and
wherein the extracting the plurality of sub-tables includes:
extracting columns or rows associated with a grouping based on the columns or rows targeted by the groupings of the operations.

12. The system of claim 7, the operations further comprising, before determining the one or more data operations:
receiving imported data; and
generating an initial multi-dimensional dataset based on the imported data and/or determining an existing multi-dimensional dataset to be updated based on the imported data, the initial multi-dimensional dataset or the existing multi-dimensional dataset being the multi-dimensional dataset upon which the one or more data operations are performed.

13. A non-transitory computer-readable medium storing instructions that, when executed by a processor, cause the processor to perform operations data wrangling, the operations comprising:
determining one or more data operations to be performed on a multi-dimensional dataset;
determining at least one operation type associated with the one or more data operations to be performed;
determining a plurality of scripts and a plurality of sub-tables based on the at least one operation type;
extracting the sub-tables from the multi-dimensional dataset;
providing the plurality of scripts and the plurality of sub-tables to a data wrangling process, the data wrangling process processing each of the plurality of sub-tables in parallel using the scripts to determine a processed plurality of sub-tables;
receiving completion message(s) from the data wrangling process, the completion message(s) including the processed plurality of sub-tables; and
re-joining the processed plurality of sub-tables to the multi-dimensional dataset,
wherein the re-joining the processed plurality of sub-tables to the multi-dimensional dataset comprises:
extracting the processed plurality of sub-tables from the completion message(s); and
updating tables of the multi-dimensional dataset based on the processed plurality of sub-tables.

14. The non-transitory computer-readable medium of claim 13, wherein the data wrangling process comprises:
transmitting the scripts and plurality of sub-tables to a server, the server processing the plurality of sub-tables in parallel using the scripts and plurality of sub-tables to determine the processed plurality of sub-tables; and
receiving the completion message(s) from the server, the completion message(s) including the processed plurality of sub-tables; and
re-joining the processed plurality of sub-tables to the multi-dimensional dataset.

15. The non-transitory computer-readable medium of claim 13, wherein determining the plurality of scripts and the plurality of sub-tables based on the operation type further comprises:
splitting the multi-dimensional dataset into tables;
determining groupings of operations based on columns and/or rows of the tables targeted by the data operations;
extracting the plurality of sub-tables from the tables based on the groupings; and
determining scripts for each of the plurality of sub-tables based on the groupings.

16. The non-transitory computer-readable medium of claim 13, wherein determining the plurality of scripts and the plurality of sub-tables based on the operation type further comprises:
splitting the multi-dimensional dataset into tables;
determining groupings of operations based on columns and/or rows of the tables targeted by the data operations;
extracting the plurality of sub-tables from the tables based on the groupings; and determining scripts for each of the plurality of sub-tables based on the groupings, and wherein determining groupings of operations further comprises:

determining at least one operation of the one or more data operations to be performed on a column or row; and determining at least two operations of the one or more data operations to be performed on adjacent columns or rows, and/or determining a plurality of operations of the one or more data operations to be performed on columns or rows within a threshold number of columns or rows from each other.

17. The non-transitory computer-readable medium of claim 13, wherein determining the plurality of scripts and the plurality of sub-tables based on the operation type further comprises:

splitting the multi-dimensional dataset into tables;

determining groupings of operations based on columns and/or rows of the tables targeted by the data operations;

extracting the plurality of sub-tables from the tables based on the groupings; and determining scripts for each of the plurality of sub-tables based on the groupings, and wherein the extracting the sub-tables includes:

extracting columns or rows associated with a grouping based on the columns or rows targeted by the groupings of the operations.

* * * * *